(12) United States Patent
Gotesdiner

(10) Patent No.: US 12,166,691 B2
(45) Date of Patent: *Dec. 10, 2024

(54) SYSTEM AND METHOD FOR PROVIDING STRATEGIC SOLUTION FOR HIGH VOLUME ON REAL TIME FEEDS

(71) Applicant: JPMorgan Chase Bank, N.A., New York, NY (US)

(72) Inventor: Marcelo Gotesdiner, Tzur Yitzhak (IL)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/372,946

(22) Filed: Sep. 26, 2023

(65) Prior Publication Data

US 2024/0022522 A1 Jan. 18, 2024

Related U.S. Application Data

(63) Continuation of application No. 17/649,221, filed on Jan. 28, 2022, now Pat. No. 11,805,072.

(51) Int. Cl.
*H04L 47/80* (2022.01)
*H04L 47/70* (2022.01)
*H04L 47/783* (2022.01)

(52) U.S. Cl.
CPC .......... *H04L 47/801* (2013.01); *H04L 47/783* (2013.01); *H04L 47/821* (2013.01); *H04L 47/824* (2013.01)

(58) Field of Classification Search
CPC ... H04L 47/821; H04L 47/824; H04L 47/783; H04L 47/801

USPC .......................................................... 370/230
See application file for complete search history.

(56) References Cited

U.S. PATENT DOCUMENTS

| | | | | |
|---|---|---|---|---|
| 7,733,870 B1* | 6/2010 | Liu | ..................... | H04L 41/0896 398/58 |
| 8,661,001 B2* | 2/2014 | Eliashberg | .......... | H04L 63/0823 707/694 |
| 9,846,716 B1* | 12/2017 | Scott | .................... | G06F 16/2365 |
| 10,684,350 B2* | 6/2020 | Dupray | .................... | G01S 19/46 |

(Continued)

OTHER PUBLICATIONS

International Search Report dated May 15, 2023 and issued in International Application No. PCT/US22/51822.

(Continued)

*Primary Examiner* — Robert J Lopata
(74) *Attorney, Agent, or Firm* — GREENBLUM & BERNSTEIN, P.L.C.

(57) ABSTRACT

A method for distributing data process according to technical resource capacity availability and constraints across a network is disclosed. The method includes receiving, at a database, a feed request for processing by a computing resource, among a network of computing resources that are geographically dispersed. Further, the method includes identifying, among the network of computing resources, a computing resource for processing the feed request based on the at least one attribute and processing capacity of the computing resources, and assigning the feed request for processing to the identified computing resource in real-time and without predetermined assignment to process increase in data volume by leveraging remotely located and/or underutilized computing resources.

20 Claims, 10 Drawing Sheets

(56) References Cited

U.S. PATENT DOCUMENTS

| | | | |
|---|---|---|---|
| 2008/0120273 A1* | 5/2008 | Ramesh | G06F 16/24545 |
| 2011/0218838 A1* | 9/2011 | Byce | G06Q 40/02 |
| | | | 705/7.29 |
| 2015/0348106 A1* | 12/2015 | Yao | G06Q 30/0256 |
| | | | 705/14.54 |
| 2017/0279736 A1 | 9/2017 | Pitio et al. | |
| 2019/0121669 A1* | 4/2019 | Almasan | G06F 9/4881 |
| 2020/0236158 A1 | 7/2020 | Pitio et al. | |
| 2021/0174302 A1* | 6/2021 | Brahmbhatt | G06Q 10/10 |
| 2021/0266236 A1* | 8/2021 | Dwyer | G06T 11/001 |
| 2022/0172176 A1* | 6/2022 | Bueche, Jr. | G10L 15/22 |
| 2022/0353350 A1* | 11/2022 | Kim | G06Q 30/06 |
| 2022/0417147 A1* | 12/2022 | Woodworth | H04L 45/08 |
| 2023/0179536 A1* | 6/2023 | Sathasivan | H04L 47/70 |
| | | | 709/226 |

OTHER PUBLICATIONS

Written Opinion dated May 15, 2023 and issued in International Application No. PCT/US22/51822.

International Preliminary Report on Patentability dated Jul. 30, 2024 issued in International Patent Application No. PCT/US2022/051822.

\* cited by examiner

SYSTEM AND METHOD FOR PROVIDING STRATEGIC SOLUTION FOR HIGH VOLUME ON REAL TIME FEEDS

CROSS-REFERENCE TO RELATED APPLICATION

This is a continuation application of pending U.S. patent application Ser. No. 17/649,221, filed on Jan. 28, 2022. The disclosures of this document, including the specifications, drawings and claims, are incorporated herein by reference in their entirety.

TECHNICAL HELD

This disclosure generally relates to a system and method for providing a strategic solution for high volume on real time feeds. More specifically, this disclosure relates to a system and method for prioritizing, diverting, and/or identifying events for targeted distribution or allocation of technical resources for improved processing capability of real time feeds.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, a downstream feed system may perform real time processing of events in a large organization requires high processing level and resources to analyze and generate messages to be sent to various downstream systems. Such a system may manage high volumes of transactions, which may often run up against technical resource or capacity constraints, such as memory, CPU, and capacity available at an assigned computer/server or a group of computers/servers.

Further, regulatory offices or downstream systems may each have policies regarding times to be updated for the volumes of transactions. Various reports may be required to be generated and sent to the regulatory offices complying with such times, and using expected protocols. However, with incremental increases in the volumes of transactions, machine capacity for assigned computers/servers may be overloaded and jeopardize commitment to such rules.

SUMMARY

According to an aspect of the present disclosure, a method for distributing data process according to technical resource capacity availability and constraints across a network is provided. The method includes performing, using a processor and a memory: receiving, at a database, a feed request for processing; in response to receiving the feed request, informing, a data stream and by the database, of the receipt of the feed request at the database; acquiring the feed request by the data stream; reading and parsing the feed request for determining at least one attribute of the feed request; identifying, among multiple computing resources spread across a network, a computing resource for processing the feed request based on the at least one attribute and processing capacity at the multiple computing resources; assigning the feed request for processing to the identified computing resource; processing, at the identified computing resource, the feed request; generating, at the identified computing resource, a downstream transaction for the processed feed request, and saving the downstream transaction at the database; generating, at the identified computing resource, a message indicating processing of the feed request, and saving the message at the database; returning, to the message feeder, the downstream transaction and the message; and updating the database based on the returned downstream transaction and the message.

According to another aspect of the present disclosure, the identified computing resource is located remotely.

According to another aspect of the present disclosure, the identified computing resource is located in a cloud network.

According to yet another aspect of the present disclosure, the data stream is informed of the received feed request in real time for processing of the feed request upon receipt of the feed request at the database.

According to another aspect of the present disclosure, the multiple computing resources are spread across various geographies, countries or continents.

According to a further aspect of the present disclosure, the at least one attribute includes a priority level for processing of the feed request.

According to yet another aspect of the present disclosure, an amount of delay before processing is determined based on the priority level.

According to a further aspect of the present disclosure, the at least one attribute includes a geographic location for processing the feed request.

According to another aspect of the present disclosure, the at least one attribute includes a memory and time limit.

According to a further aspect of the present disclosure, the at least one attribute includes a dedicated processing requirement.

According to a further aspect of the present disclosure, the method further includes generating a report based on information updated on the database.

According to a further aspect of the present disclosure, the report indicates, for a computing resource, at least one of a number of processes running per minute, a number of tasks processed per process, time percentage that each process was running, time to process a task, a number of tasks in a backlog, and a number of tasks of a same type in the backlog.

According to a further aspect of the present disclosure, the feed request received by the database for processing is a feed request filtered according to an event type.

According to a further aspect of the present disclosure, the at least one attribute includes a priority level for processing of the feed request, and the priority level for the feed request is set by a user or according to an event type of the feed request.

According to another aspect of the present disclosure, the method further includes receiving, at the database, a subsequent feed request for processing; in response to receiving the subsequent feed request, informing, the data stream and by the database, of the receipt of the subsequent feed request at the database; acquiring the subsequent feed request by the data stream; reading and parsing the subsequent feed request for determining at least one attribute of the subsequent feed request; checking to determine whether the feed request has been assigned for processing prior to assigning the subsequent feed request for processing; and removing the subsequent feed request from the database if the existing feed request has not yet been assigned for processing.

According to another aspect of the present disclosure, each feed request stems from a deal, and the method further includes ordering of feed requests according to a deal the feed requests stem from, such that data for the deal is read only once during processing of a first feed request stemming from the deal for faster processing.

According to another aspect of the present disclosure, a lower priority level feed request is processed by a computing resource that is located further way than a higher priority level feed request.

According to another aspect of the present disclosure, the feed request is dynamically assigned for processing in real-time without a predetermined assignment to a computing resource.

According to another aspect of the present disclosure, a system for distributing data process according to technical resource capacity availability and constraints across a network is disclosed. The system includes at least one processor; at least one memory; and at least one communication circuit. The at least one processor is configured to: receive, at a database, a feed request for processing; in response to receiving the feed request, inform, a data stream and by the database, of the receipt of the feed request at the database; acquire the feed request by the data stream; read and parse the feed request for determining at least one attribute of the feed request; identify, among multiple computing resources spread across a network, a computing resource for processing the feed request based on the at least one attribute and processing capacity at the multiple computing resources; assign the feed request for processing to the identified computing resource; process, at the identified computing resource, the feed request; generate, at the identified computing resource, a downstream transaction for the processed feed request, and save the downstream transaction at the database; generate, at the identified computing resource, a message indicating processing of the feed request, and save the message at the database; return, to the message feeder, the downstream transaction and the message; and update the database based on the returned downstream transaction and the message.

According to another aspect of the present disclosure, a non-transitory computer readable storage medium that stores a computer program for distributing data process according to technical resource capacity availability and constraints across a network is disclosed. The computer program, when executed by a processor, causing a system to perform a process including receiving, at a database, a feed request for processing; in response to receiving the feed request, informing, a data stream and by the database, of the receipt of the feed request at the database; acquiring the feed request by the data stream; reading and parsing the feed request for determining at least one attribute of the feed request; identifying, among multiple computing resources spread across a network, a computing resource for processing the feed request based on the at least one attribute and processing capacity at the multiple computing resources; assigning the feed request for processing to the identified computing resource; processing, at the identified computing resource, the feed request; generating, at the identified computing resource, a downstream transaction for the processed feed request, and saving the downstream transaction at the database; generating, at the identified computing resource, a message indicating processing of the feed request, and saving the message at the database; returning, to the message feeder, the downstream transaction and the message; and updating the database based on the returned downstream transaction and the message.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
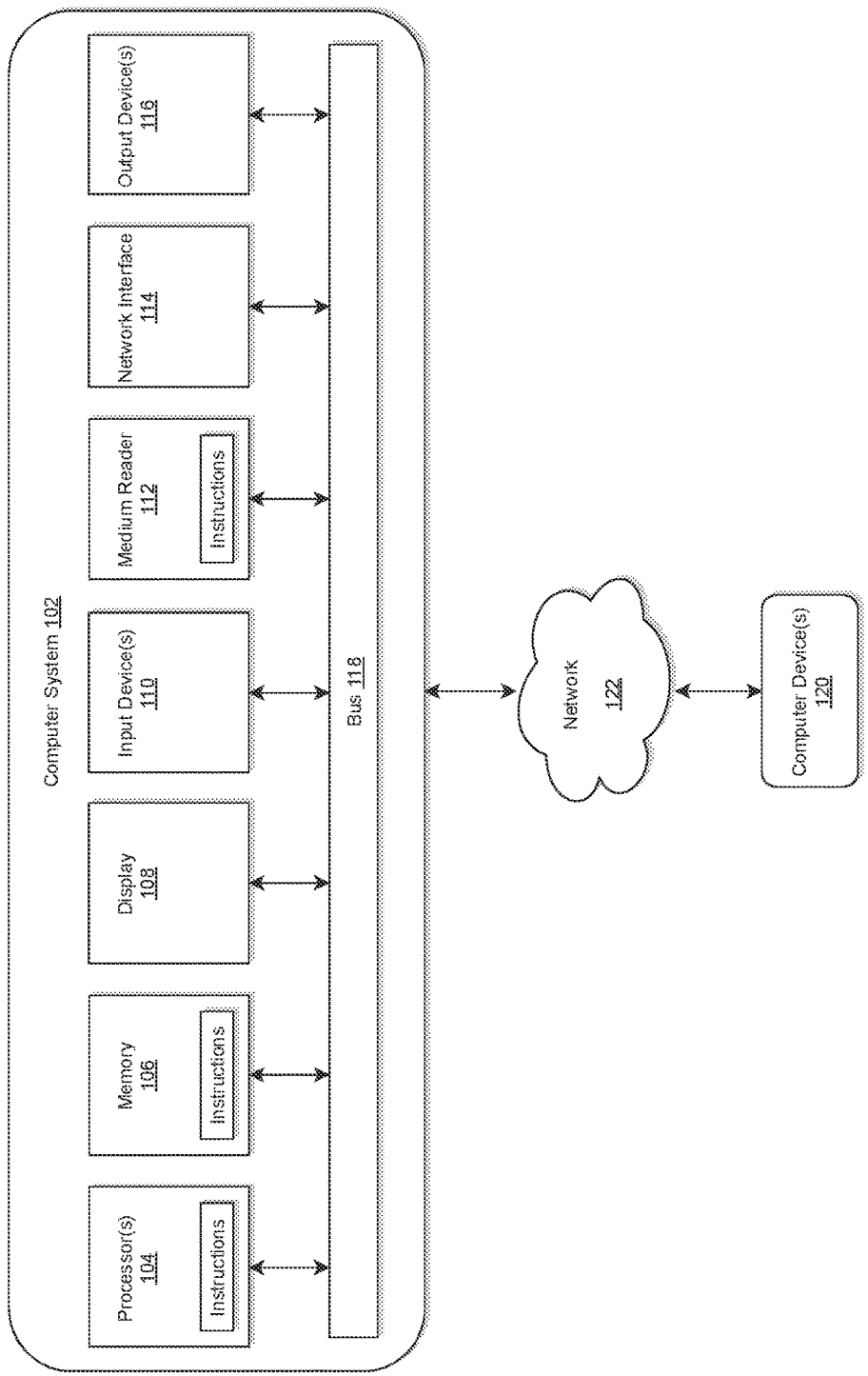
FIG. 1 illustrates a computer system for implementing a technical resource capacity distribution/allocation (TRCDA) system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a technical resource capacity distribution/allocation (TRCDA) system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
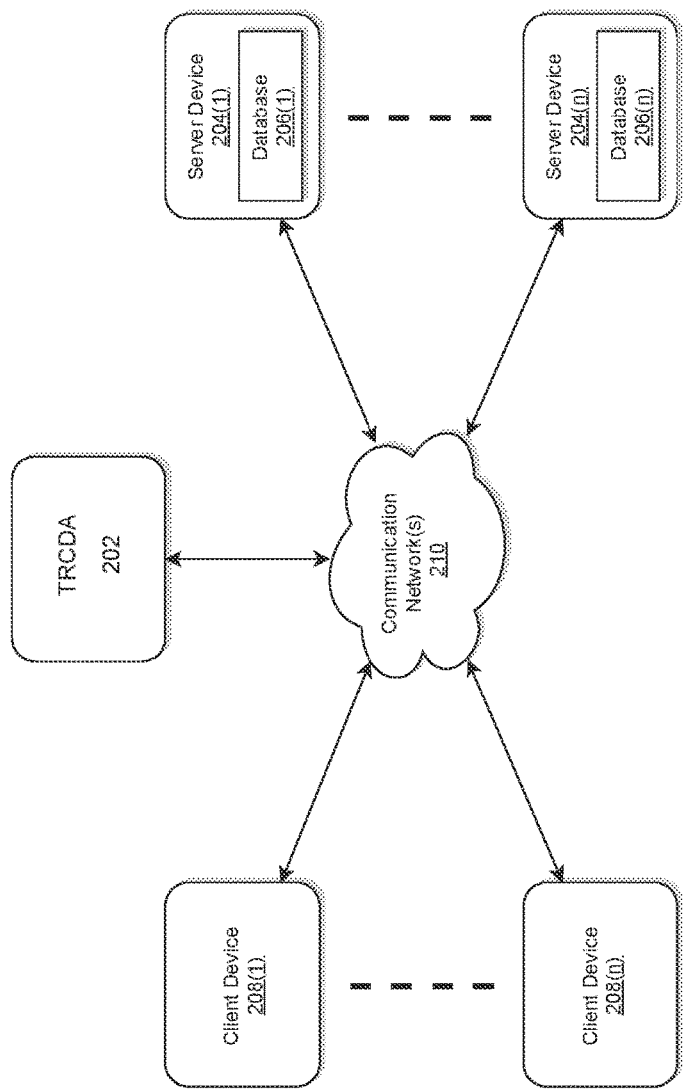
FIG. 2 illustrates an exemplary diagram of a network environment with a technical resource capacity distribution/allocation system in accordance with an exemplary embodiment.

FIG. 2 illustrates an exemplary diagram of a network environment with a technical resource capacity distribution/allocation system in accordance with an exemplary embodiment.

A technical resource capacity distribution/allocation (TRCDA) system 202 may be the same or similar to the computer system 102 as described with respect to FIG. 1.

The TRCDA system 202 may store one or more applications that can include executable instructions that, when executed by the TRCDA system 202, cause the TRCDA system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the TRCDA system 202 itself, may be located in virtual server(s) running in a cloud-based computing environment rather than being tied to one or more specific physical network computing devices or resources. Also, the application(s) may be running in one or more virtual machines (VMs) executing on the TRCDA system 202. Additionally, in one or more embodiments of this technology, virtual machine(s) running on the TRCDA system 202 may be managed or supervised by a hypervisor.

In the network environment 200 of FIG. 2, the TRCDA system 202 is coupled to a plurality of server devices 204(1)-204(n) that hosts a plurality of databases 206(1)-206(n), and also to a plurality of client devices 208(1)-208(n) via communication network(s) 210. A communication interface of the TRCDA system 202, such as the network interface 114 of the computer system 102 of FIG. 1, operatively couples and communicates between the TRCDA system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TRCDA system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TRCDA system 202 may be a standalone device or integrated with one or more other devices or apparatuses, such as one or more of the server devices 204(1)-204(n), for example. In one particular example, the TRCDA system 202 may be hosted by one of the server devices 204(1)-204(n), and other arrangements are also possible. Moreover, one or more of the devices of the TRCDA system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TRCDA system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the TRCDA system 202 that may efficiently provide a platform for implementing a cloud native TRCDA module, but the disclosure is not limited thereto.

The client devices 208(1)-208(n) may run interface applications, such as standard web browsers or standalone client applications, which may provide an interface to communicate with the TRCDA system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the TRCDA system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TRCDA system 202, the server devices 204(1)-204(n), or the client devices 208(1)-208(n), for example, may be configured to operate as virtual instances on the same physical machine. For example, one or more of the TRCDA system 202, the server devices 204(1)-204(n), or the client devices 208(1)-208(n) may operate on the same physical device rather than as separate devices communicating through communication network(s) 210. Additionally, there may be more or fewer TRCDA systems 202, server devices 204(1)-204(n), or client devices 208(1)-208(n) than illustrated in FIG. 2. According to exemplary embodiments, the TRCDA system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
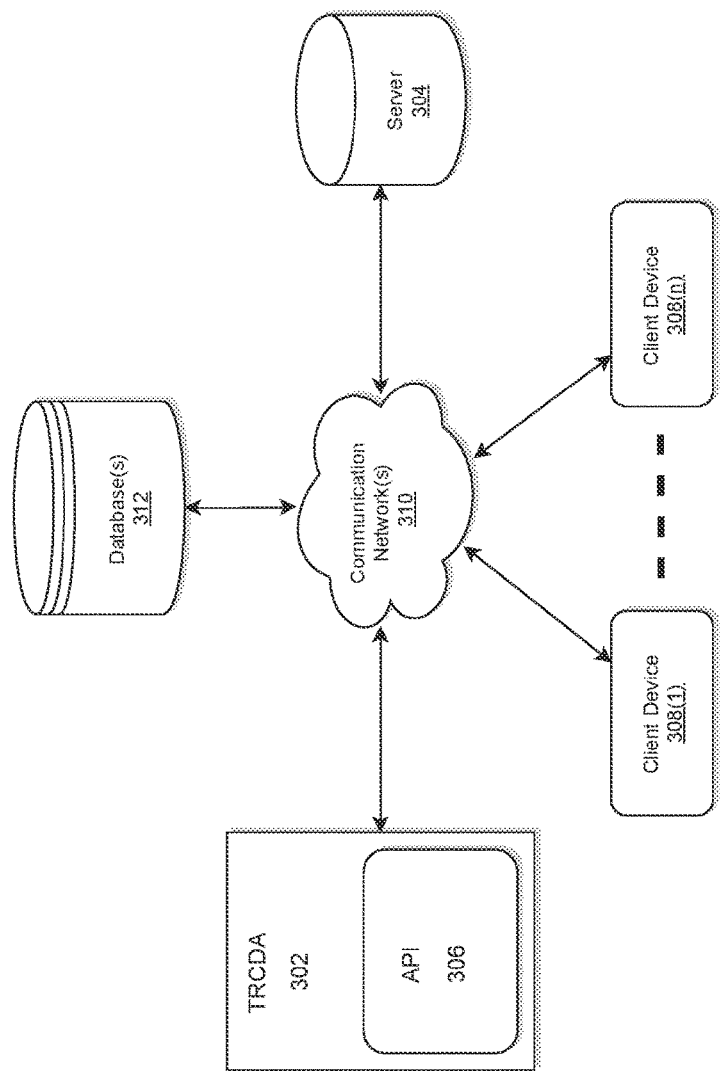
FIG. 3 illustrates a system diagram for implementing a technical resource capacity distribution/allocation system in accordance with an exemplary embodiment.

FIG. 3 illustrates a system diagram for implementing a technical resource capacity distribution/allocation system in accordance with an exemplary embodiment.

As illustrated in FIG. 3, the system 300 may include a TRCDA system 302 within which a group of API modules 306 is embedded, a server 304, a database(s) 312, a plurality of client devices 308(1) . . . 308(n), and a communication network 310.

According to exemplary embodiments, the TRCDA system 302 including the API modules 306 may be connected to the server 304, and the database(s) 312 via the communication network 310. Although there is only one database has been illustrated, the disclosure is not limited thereto. Any number of databases may be utilized. The TRCDA System 302 may also be connected to the plurality of client devices 308(1) . . . 308(n) via the communication network 310, but the disclosure is not limited thereto.

According to exemplary embodiment, the TRCDA system 302 is described and shown in FIG. 3 as including the API modules 306, although it may include other rules, policies, modules, databases, or applications, for example. According to exemplary embodiments, the database(s) 312 may be embedded within the TRCDA system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable TRCDA as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the TRCDA system 302. In this regard, the plurality of client devices 308(1) . . . 308(n) may be "clients" of the TRCDA system 302 and are described herein as such. Nevertheless, it is to be known and understood that the plurality of client devices 308(1) . . . 308(n) need not necessarily be "clients" of the TRCDA system 302, or any entity described in association therewith herein. Any additional or alternative relationship may exist between either or both of the plurality of client devices 308(1) . . . 308(n) and the TRCDA system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the TRCDA system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The TRCDA system 302 may be the same or similar to the TRCDA system 202 as described with respect to FIG. 2, including any features or combination of features described with respect thereto.

Figure 4:
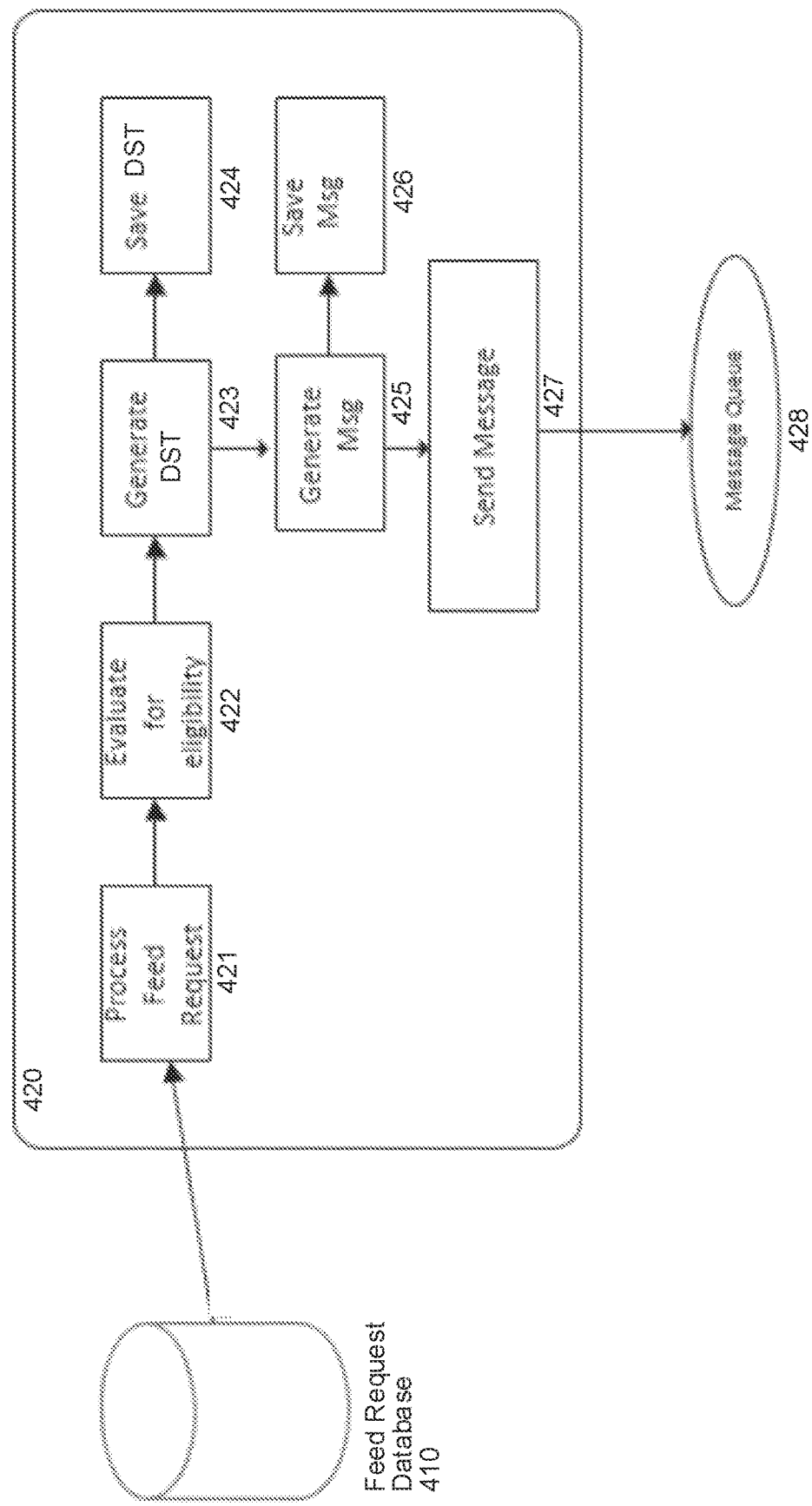
FIG. 4 illustrates a system diagram of a technical resource capacity distribution/allocation system in accordance with an exemplary embodiment.

FIG. 4 illustrates a system diagram of a technical resource capacity distribution/allocation system in accordance with an exemplary embodiment.

A feed request database (FR DB) 410 may be a centralized database that receives various feed requests from multiple lines of businesses (LOBs) for storage. According to exemplary aspects, each line of business may provide a feed request with certain attributes, such as priority level or technical requirements, for processing. Upon receiving the feed requests, a technical resource capacity distribution/allocation system (TRCDA) 420 may be alerted of the newly received or stored feed request. According to aspects, the alert may be provided instantaneously in real-time, at predetermined intervals, or upon reaching a predetermined condition (e.g., feed request of a certain event type) or threshold. However, aspects of the present disclosure are not limited thereto, such that alerts may be provided upon reaching a different criteria, or feed requests may be sent without providing any advance alert.

Upon receiving an alert, the TRCDA 420 may acquire or obtain the feed request received and stored at the feed request database 410 for processing. According to exemplary aspects, feed request retrieved from the feed request database 410 from different lines of business may indicate different prioritization of the feed requests. For example, certain feed requests may specify for non-priority processing, which may be held in queue and then released later for processing based on data processing load, or for immediate processing. According to exemplary aspects, an amount of delay prior to processing may be determined based on a priority level specified for the feed request and/or availability of technical resources for performing processing.

For priority or immediate processing, the feed request may be assigned to be processed by an earlier available computing device or resource (e.g., computer, server, computing box, a cloud networked computing resource, and etc.) having technical capacity among a network of computing devices, regardless of whether the earlier available computing device or resource is located locally or not. More specifically, although certain lines of businesses may typically be assigned to a particular computing devices for processing, feed requests may be allocated or distributed, in real time and without predetermined assignments, to different computing devices that may be located remotely for processing to ensure timely processing. Further, certain feed requests may specify for dedicated processing. For example, heavier tasks, for which processing may be time/CPU/memory intensive, may be distributed to an idle or less utilized computing device (e.g., computing devices that may be located in Asia for processing of feed requests generating from North America) for dedicated processing. In addition to the above, based on computing device specifications, network speed, latency, geography, time, days, or other factors, one or more devices within a network of computing devices may be leveraged as dedicated computing devices for processing of more resource intensive tasks. Such designations may be modified based on computing load across the network of computing devices based on received data volume.

According to exemplary aspects, the TRCDA 420 may monitor resource utilization across the network of computing devices for an organization. In an example, the network of computing devices may include computing devices of various specifications located across the globe. By monitoring and managing of computing resources (e.g., CPU, memory, and the like), additional increase in data volume may be timely handled by distribution of computing load to computing devices that may be available for processing. For example, due to time difference between various geographies, computing devices located in different locations (e.g., counties/cities, states, countries, or continents) may have different utilization rates throughout the day. By redistributing of computing load or reallocating of computing resources in real-time, technical resources of less utilized computing devices may be more efficiently utilized for processing of sudden increase in data or feed requests, without the need for adding additional computing hardware.

According to exemplary aspects, the TRCDA 420 may be configured to provide a multiprocessing environment to allow parallel processing. Further, processing may be configured on one or more attributes, including, without limitation, a location to run (e.g., local, other server boxes, or cloud network), priority level (e.g., dedicated process may be set aside for certain task priorities), memory and time limit (e.g., to avoid potential overload or timeout), recycle policy (e.g., a policy indicating whether a process meeting a resource limit should be recycled or not), process dynamic generation (e.g., option to define how many process are required and generate process automatically based on a backlog) and the like.

The TRCDA 420, in receipt of the feed requests, performs several processes to prioritize, divert and/or identify events for targeted distribution or allocation of technical resources for improved processing capability of real time feeds. In an example, feed requests stemming from a same deal/project/source file may be allocated to the same computing device for more efficient processing as data related to the deal/project/source file may be read once, as opposed to every iteration the feed request is processed for conservation of memory and CPU resources. Further, feed requests corresponding to a certain event type may be grouped for processing by a same computing device or a group of same computing devices.

The processes performed by the TRCDA 420 may include, without limitation, at least operations for processing feed request 421, evaluating for eligibility 422, generating of downstream trades or transactions (DSTs) 423, saving of DSTs 424, generating of messages 425, and saving of messages 426, and sending of the message 427. The sent message may be placed in a message queue 428 according to a certain priority based on attributes specified in the sent message. According to exemplary aspects, the messages may be generated in a protocol specified in the feed request or as specified a receiving device/process. Further, in an example, a priority level for a feed request may be set by a user or automatically based on an event type of the feed request. Further to the above, according to exemplary aspects, feed requests for processing may be filtered for processing according to an event type.

According to exemplary aspects, the processing of feed request 421 may include reading, parsing and/or additional operations for processing of the acquired feed request for analysis. The processed feed request may indicate, without limitation, attributes indicating processing priority, technical resource requirements, and the like.

In operation 422, the processed feed request is analyzed to determine eligibility for processing of downstream trades or transactions. For example, the attributes of the feed request may be analyzed in view of other feed requests for determining whether an event of the feed request is eligible for processing or not. If the event of the feed request is determined not to be eligible for processing of downstream trades or transactions, an empty downstream trade or transaction may be generated and the feed request may be removed from the feed request database 410.

On the other hand, if the event of the feed request is determined to be eligible for processing of downstream trades or transactions, then a downstream trade or transaction may be generated for the feed request in operation 423. Further, according to exemplary aspects, TRCDA 420 may collect data processing per task and/or processing per component to analyze processing behavior for fine tuning as required. Between data collections, various information may be determined, such as a number of processes running per minute, a number of tasks processed per process, time percentage that process was running for an assigned task, time to process a task, a number of tasks in backlog, a number of tasks of same type in backlog, and the like.

In operation 424, the generated downstream trade or transaction is then saved in the feed request database 410.

In operation 425, a message is generated in a protocol requested by the respective line of business. In operation 426, the generated message is then saved in the feed request database 410. Then the generated downstream trade or transaction and the message is sent to a message queue in operation 427. The message queue 428

Figure 5:
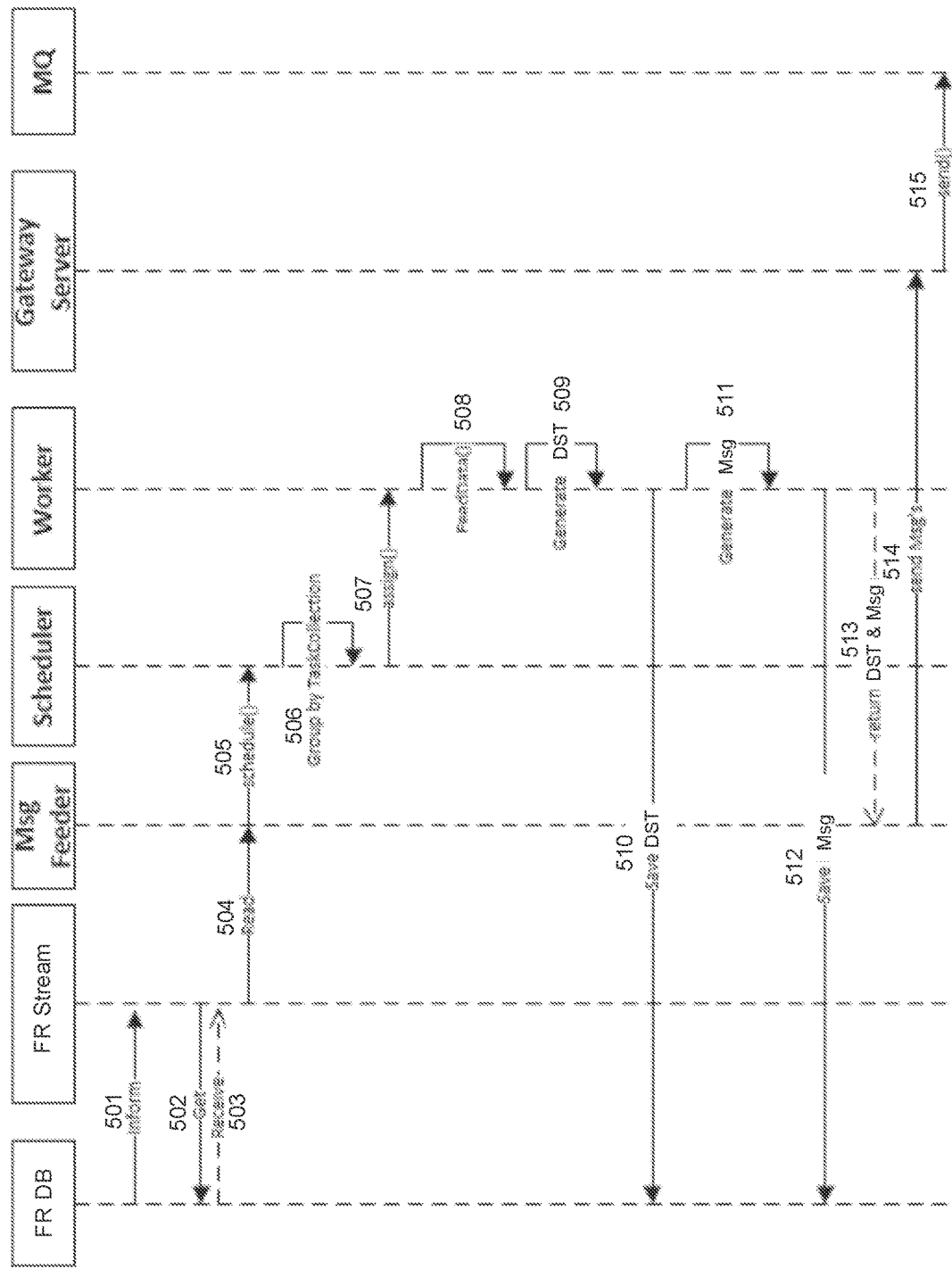
FIG. 5 is a process flow illustrating a feed request for performing technical resource capacity distribution/allocation in accordance with an exemplary embodiment.

FIG. 5 is a process flow illustrating a feed request for performing technical resource capacity distribution/allocation in accordance with an exemplary embodiment.

In operation 501, a feed request database (FR DB) informs a feed request (FR) stream of a feed request received and stored at the feed request database. According to exemplary aspects, inform mechanism of the feed request database reacts immediately upon receiving a new feed request, to push the new feed request to a scheduler for processing. As a result, timing of requests waiting in the feed request database may be improved to reduce delay in waiting to provide real-time processing. However, aspects of the present disclosure are not limited thereto, such that additional checks may be performed at predetermined intervals or during a start of a process to check for feed requests in queue that have not yet been sent for processing.

In operation 502, the feed request stream in response to the notification received, performs an operation to obtain or acquired the respective feed request. In an example, the feed request may be obtained using a get or similar function.

In operation 503, the feed request stream receives or obtains the feed request for processing. In operation 504, the feed request stream reads the feed request and may perform one or more operations to process the feed request. For example, the feed request stream may read and parse the obtained feed request for analysis. Upon reading and processing of the feed request, the feed request is sent to the message feeder.

The message feeder may perform analysis on one or more attributes of the processed feed request, and schedule the feed request with a scheduler for processing according to the one or more attributes in operation 505. According to exemplary aspects, the feed request may be scheduled for processing based on one or more of a location of a computing device for processing the feed request, priority level of the feed request, memory limit, time limit, a recycle policy, process dynamic generation policy and the like. For example, if the priority level of the feed request indicates a high level for immediate processing, the feed request may be assigned to the earliest available computing device for processing. Further, among the available computing devices, the closest one may be selected for reduced network latency. A further distanced computing device may be selected for feed requests of lower priority levels. Moreover, the feed request may be assigned based on memory/time/processing requirements of the feed request. However, aspects of the present disclosure are not limited thereto, such that distributions or allocations of feed requests to computing devices located at various geographies may be based on distribution of computing load for improved efficiencies of the network of computing devices of an organization as a whole, and reliability of processing of increased volume of data or feed requests.

By distributing computing workloads across various computing devices of an organization, without being limited to a specific locale or geography, resources of less utilized computing devices may be leverage for handling additional data volume without overloading a system at a certain locale. In addition, by performing more sophisticated scheduling based on priorities of the feed requests, various lines of business may be able to have all of the necessary feed requests processed according to service level agreements while saving less critical feed requests for off-peak processing. Accordingly, by performing real-time distribution or assignments of feed request based on resource availability/capability of a network of computers located at various geographic locations/countries/continents (e.g., Brazil, England, European Union, Japan, Mexico, Singapore, United States of America), and by modifying processing of feed requests according to specified priority levels, increase in data volume may be more efficiently handled without physically increasing a number of computing devices at a more heavily processing locale.

Further to the above, real-time allocations or distribution may be specified by one or more artificial intelligence (AI) or machine learning (ML) algorithms. According to exemplary aspects, one or more AI or ML algorithms may be utilized for making adjustments in resource allocations or distribution of feed request processing based the collected data. In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 506, the scheduler may schedule feed requests for processing by grouping by task collection. In addition to determining scheduling based on priority levels, memory/time limits, consideration of locale and the like, the scheduler may group feed requests (e.g., according to event types, deals/source file/project or etc.) for processing by performing grouping by task collection.

In an example, the scheduler may be a reactive scheduler that allows to order and filter feed requests based on time of arrival and specified priority levels. Further, the feed requests may be ordered by a deal/transaction name and based on a first input and first output basis. More specifically, if events or tasks are generated for the same deal/transaction, those events may be grouped for processing by the same process and one after the other, before starting a new deal-event processing. Such approach may ensure reduced or minimal and memory usage since the required data for the deal is only read during the first event, making the processing of subsequent events much quicker and efficient.

Once the feed requests or events have been grouped for processing, the feed request may be assigned to a worker or a computing device or a cloud network among a network of computing devices or cloud networks of an organization in operation 507. The computing device or the cloud network may be selected by the scheduler based on various attributes of the feed request as well as technical resource availability for processing the feed request. As a default, a computing device that is local to the feed request may be selected if sufficient resource availability is present. If not, a more remotely located computing device may be assigned for processing. Further, by performing processing on a remotely located computing device or remote processing, issues in a single process may be quickly identified and terminated, and be able to be recycled on anew process without restarting the whole mechanism. In an examples, issues may include unexpected exception, memory issues and the like.

In operation 508, the feed request is processed by the assigned worker or computing device by feeding corresponding data. In an example, processing of the feed request may be performed by a local computing device (local processing) or a remote computing device (remote processing). By utilizing reactive remote processing, the TRCDA system may become more scalable to allow for quick updates and to support more workers on a same computing device or distributed computing devices. Such scalability feature may render legacy implementation of different locations unnecessary to have many instances for feed, as scheduler may act as a director and assign tasks to various workers despite of where a computing device may be located. Accordingly, the scheduler may be able to process a high number of requests with high number of processes that may be executed in parallel, locally or remotely.

In operation 509, a downstream trade or transaction (DST) is generated for the processed feed request. The DST may indicate information of time and memory used/spent on each phase of a circuit per process and per feeder. Such information may allow for further analysis and performance improvements. In operation 510, the worker or the assigned computing devices sends the generated DST to the feed request database to be stored thereon.

In operation 511, the worker or the assigned computing device then generates a message according to a protocol specified by the feed request. In operation 512, the worker or the assigned computing device sends the generated message to the feed request database to be stored thereon. In operation 513, the worker or the assigned computing device returns the DST and the message to the message feeder. In operation 514, the message feeder in response to receiving the DST and the message, sends the message to a gateway server. Lastly, in operation 515, the gateway server sends the message to the message queue (MQ).

Figure 6:
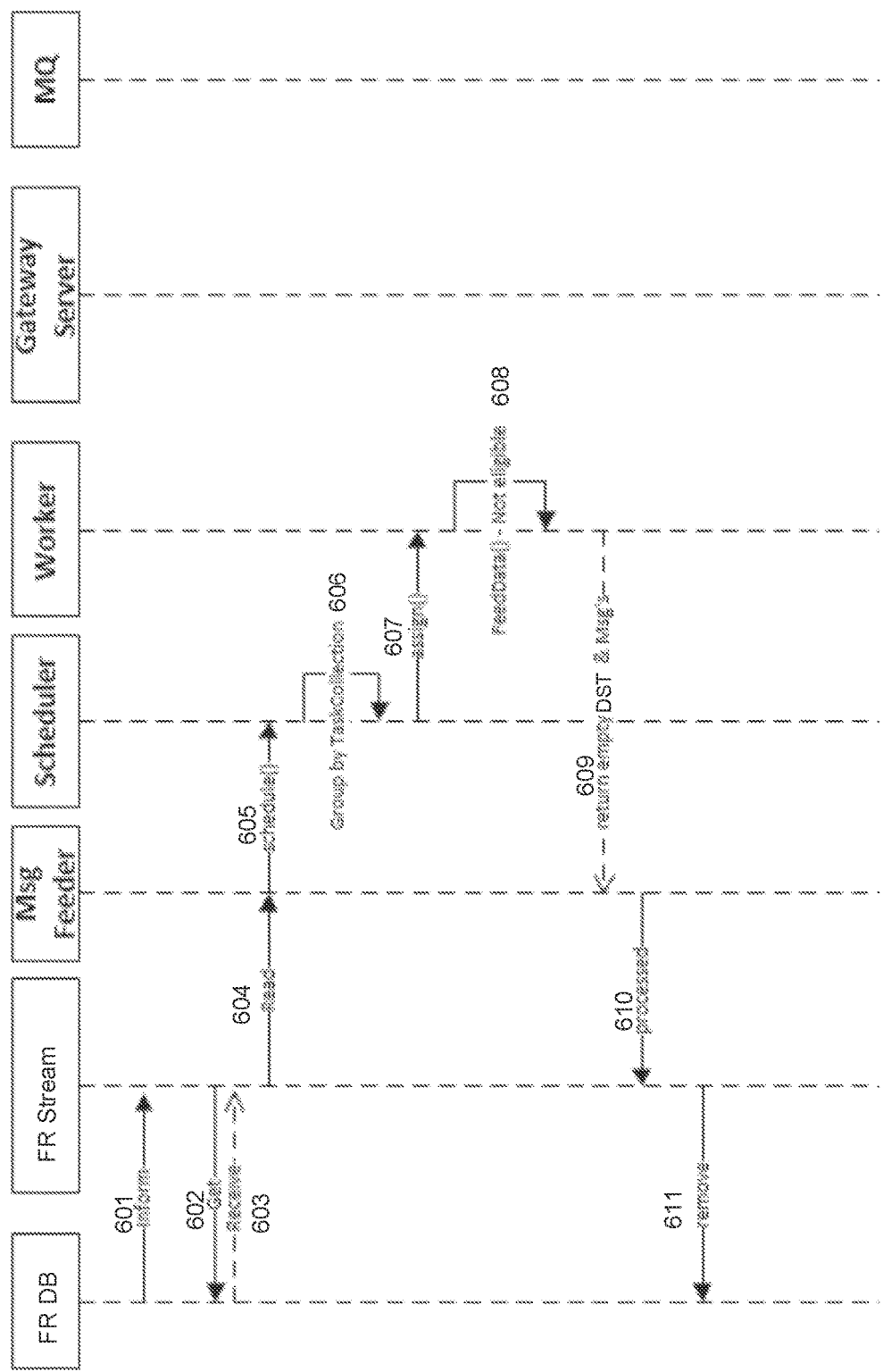
FIG. 6 is a process flow illustrating a feed request not eligible for reporting in accordance with an exemplary embodiment.

FIG. 6 is a process flow illustrating a feed request not eligible for reporting in accordance with an exemplary embodiment.

In FIG. 6, operations 601, operation 602, operation 603, operation 604, operation 605, operation 606, and operation 607 may be performed similar to operation 501, operation 502, operation 503, operation 504, operation 505, operation 506, and operation 507 of FIG. 5, respectively.

However, once the feed request is assigned to a worker or computing device, the worker or computing device may determine that the feed request or corresponding event is not eligible for generating a DST in operation 608. In such a case, the worker or computing device may then return an empty DST and message to the message feeder in operation 609. In operation 610, the message feeder process the empty DST and message, and notifies the feed request stream. In operation 611, the feed request stream removes the respective feed request that was not processed by the assigned worker or computing device from the feed request database.

Figure 7:
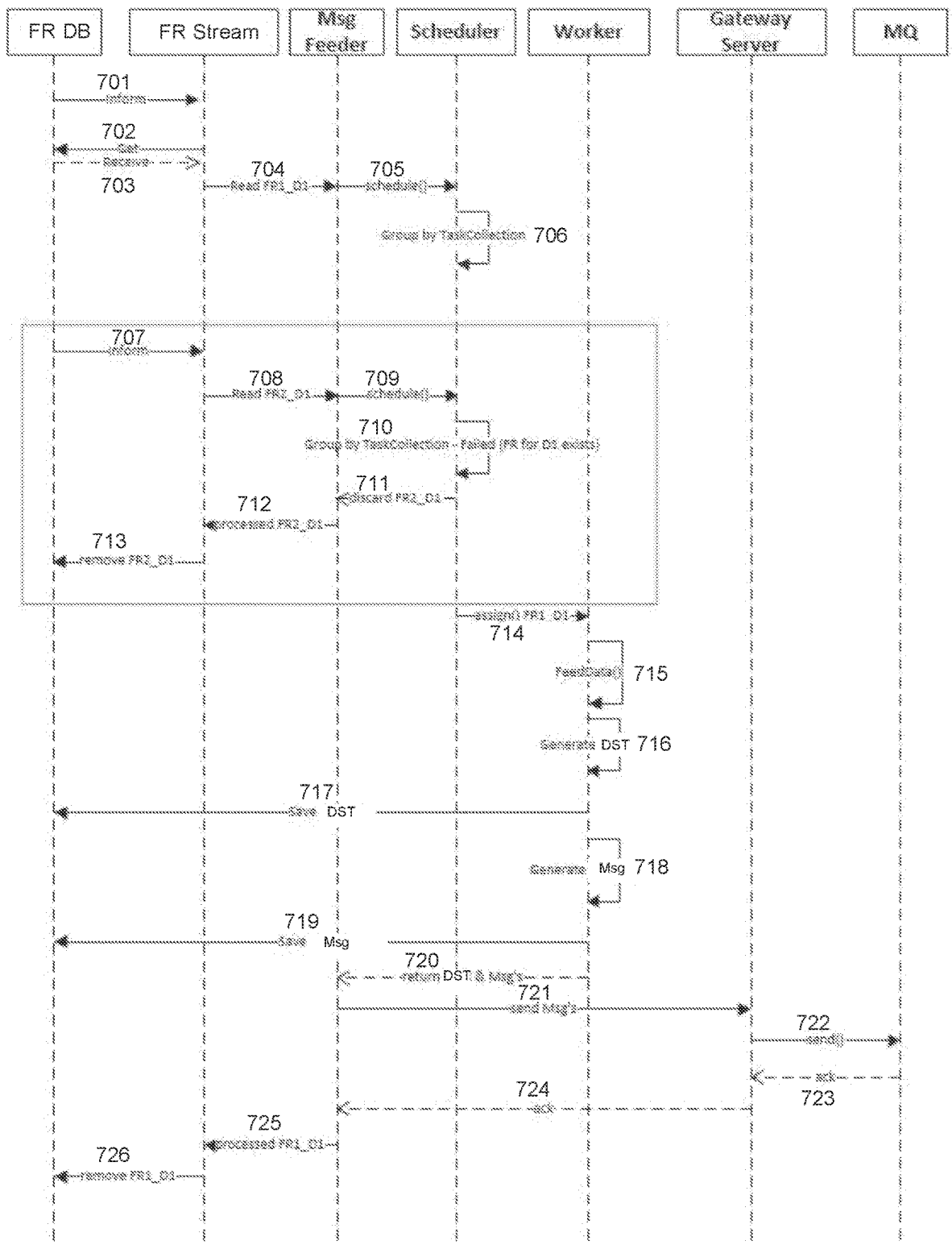
FIG. 7 is a process flow illustrating a feed request already existing in a feed request scheduler in accordance with an exemplary embodiment.

FIG. 7 is a process flow illustrating a feed request already existing in a feed request scheduler in accordance with an exemplary embodiment.

In FIG. 7, operations 701, operation 702, operation 703, operation 704, operation 705, and operation 706 may be performed similar to operation 501, operation 502, operation 503, operation 504, operation 505, and operation 506 of FIG. 5, respectively.

Operation 707, operation 708 and operation 709 may be performed similar to operation 701, operation 702, and operation 703, except that the operation 708 is for reading of feed request FR2_D1 and operation 704 is for reading feed request FR1_D1.

The scheduler, when performing operation 710 to group events or tasks based on whether the event corresponding to the feed request stems from a same deal or transaction, may fail based on a presence of a feed request that has yet to be assigned to be processed by the scheduler.

In operation 711, the scheduler discards the feed request FR2_D1 and notifies the message feeder. The message feeder processes the discarding of the feed request FR2_D1 and notifies the feed request stream in operation 712. In operation 713, the feed request stream removes the feed request FR2_D1 from the feed request database.

Operation 714, operation 715, operation 716, operation 717, operation 718, operation 719, operation 720, operation 721, and operation 722 may be performed similar to operation 507, operation 508, operation 509, operation 510, operation 511, operation 512, operation 513, operation 514, and operation 515 of FIG. 5, respectively.

In operation 723, the message queue in receipt of the message sends an acknowledgement to the gateway server. In operation 724, the gateway server in turns sends an acknowledgement to the message feeder. In operation 725, the message feeder notifies the feed request stream of the completed processing of the feed request FR1_D1. In operation 726, the feed request stream removes the respective feed request FR1_D1 from the feed request database.

Figure 8:
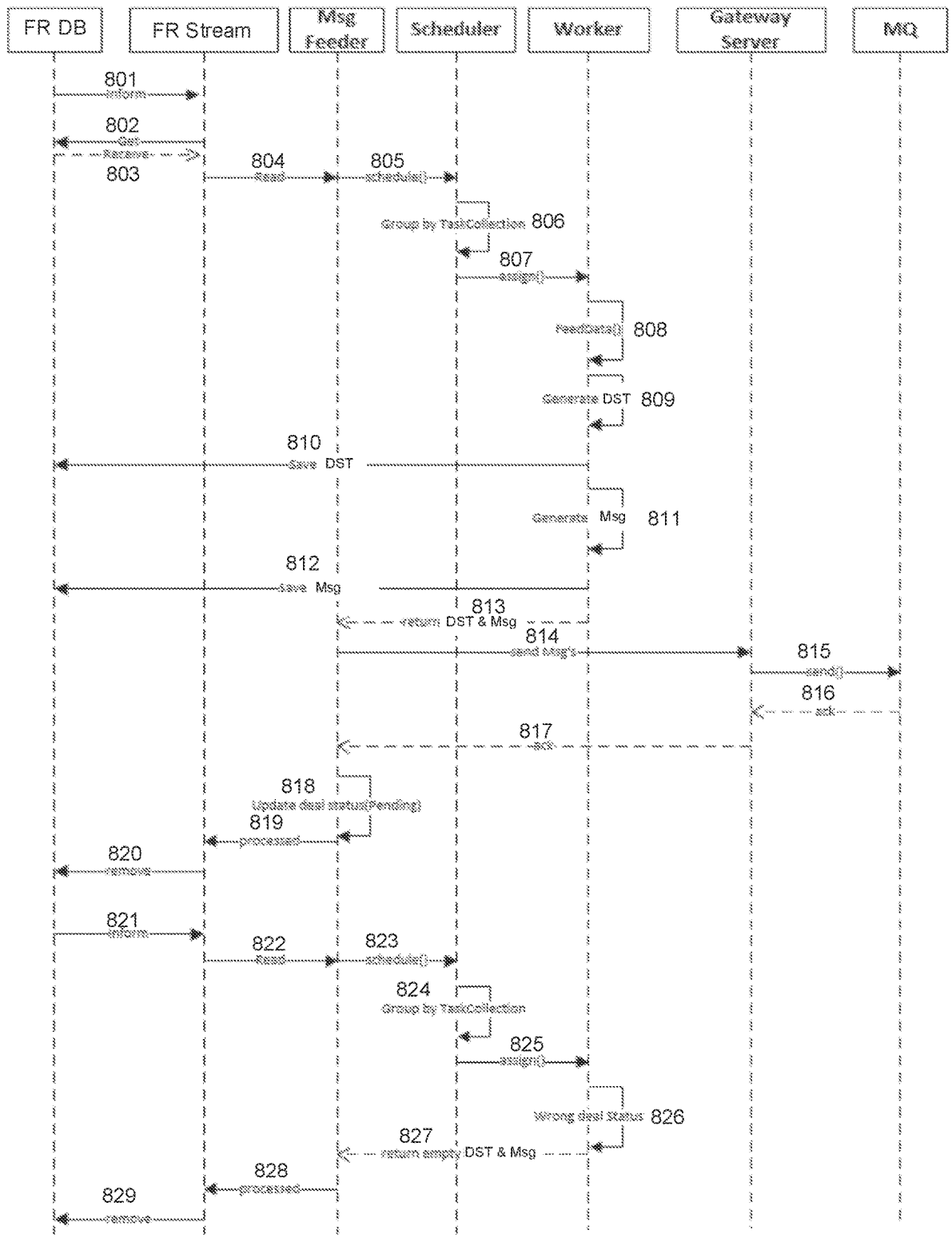
FIG. 8 is a process flow illustrating a feed request for a deal in a pending state in accordance with an exemplary embodiment.

FIG. 8 is a process flow illustrating a feed request for a deal in a pending state in accordance with an exemplary embodiment.

In FIG. 8, operations 801, operation 802, operation 803, operation 804, operation 805, and operation 806, operation 807, operation 809, operation 810, operation 811, operation 812, operation 813, operation 814 and operation 815 may be performed similar to operation 501, operation 502, operation 503, operation 504, operation 505, operation 506, operation 507, operation 509, operation 510, operation 511, operation 512, operation 513, operation 514 and operation 515 of FIG. 5, respectively.

In operation 816, the message queue in receipt of the message sends an acknowledgement to the gateway server. In operation 817, the gateway server in turns sends an acknowledgement to the message feeder. In operation 818, the message feeder updates a status of a pending deal corresponding to the processed feed request, and notifies the feed request stream of the completed processing of the respective feed request in operation 819. In operation 820, the feed request stream removes the respective feed request from the feed request database.

In operation 821, the feed request database informs a feed request stream of another feed request received and stored at the feed request database. In an example, the feed request stream may correspond to the deal that was updated in operation 818.

Operation 822, operation 823, operation 824, and operation 825 are then performed similarly to operation 804, operation 805, operation 806 and operation 807. In operation 826, the assigned worker or computing device may determine that the feed request assigned for processing may correspond to the pending deal with an outdated deal status. In that case, processing of the respective feed request may fail, and an empty DST and message may be returned to the message feeder in operation 827. In operation 828, the message feeder process the empty DST and message, and notifies the feed request stream. In operation 829, the feed request stream removes the respective feed request that was not processed by the assigned worker or computing device from the feed request database.

Figure 9:
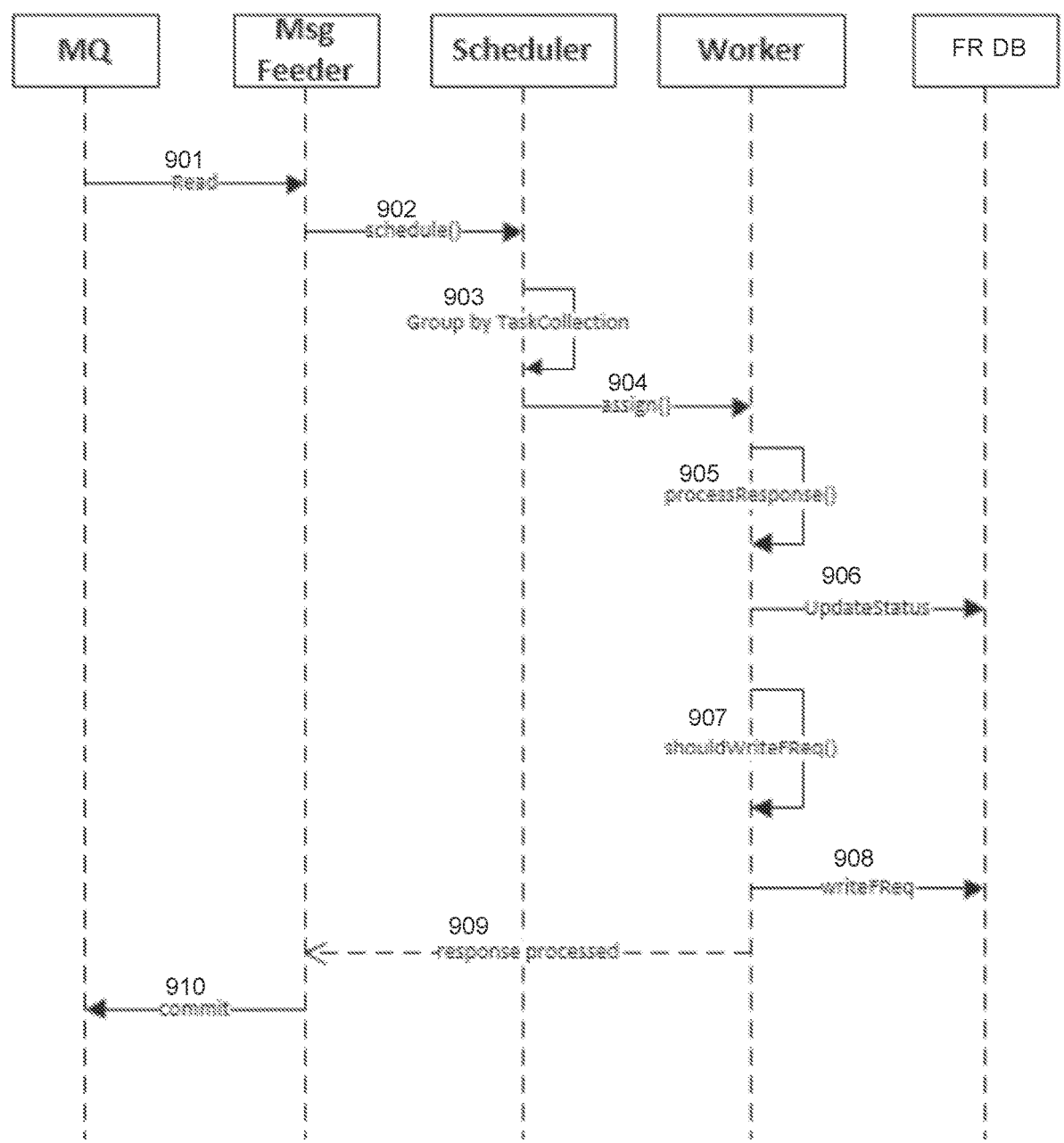
FIG. 9 is a process flow illustrating a feed response in accordance with an exemplary embodiment.

FIG. 9 is a process flow illustrating a feed response in accordance with an exemplary embodiment.

According to exemplary aspects, certain lines of business may optionally desire to receive a response on the processing of the feed request that were discussed in the previous process flows. In this regard, FIG. 9 provides an exemplary flow of providing a feed response.

In operation 901, the message quest reads a message received in its queue and notifies the message feeder of the received message. In an example, the message may indicate successful or unsuccessful processing of a feed request, receipt of DST and message, and corresponding or related information.

The message feeder then requests a scheduler to schedule processing of the message in operation 902. In operation 903, the scheduler attempts to group messages stemming from a same deal and assigns processing of the message to an available worker or computing device in operation 904. In operation 905, the assigned worker or computing device processes the message to generate a response indicating an updated status of the feed request, and in operation 906, the assigned worker or computing device sends the updated status information to the feed request database.

In operation 907, the assigned work or computing device performs a shouldWriteFReq( ), and transmits the writeFReq to the feed request database in operation 908. In operation 909, the assigned worker or computing device transmits the processing of the response to the message feeder. In operation 910, the message feeder commits to the message queue to free up memory.

Figure 10:
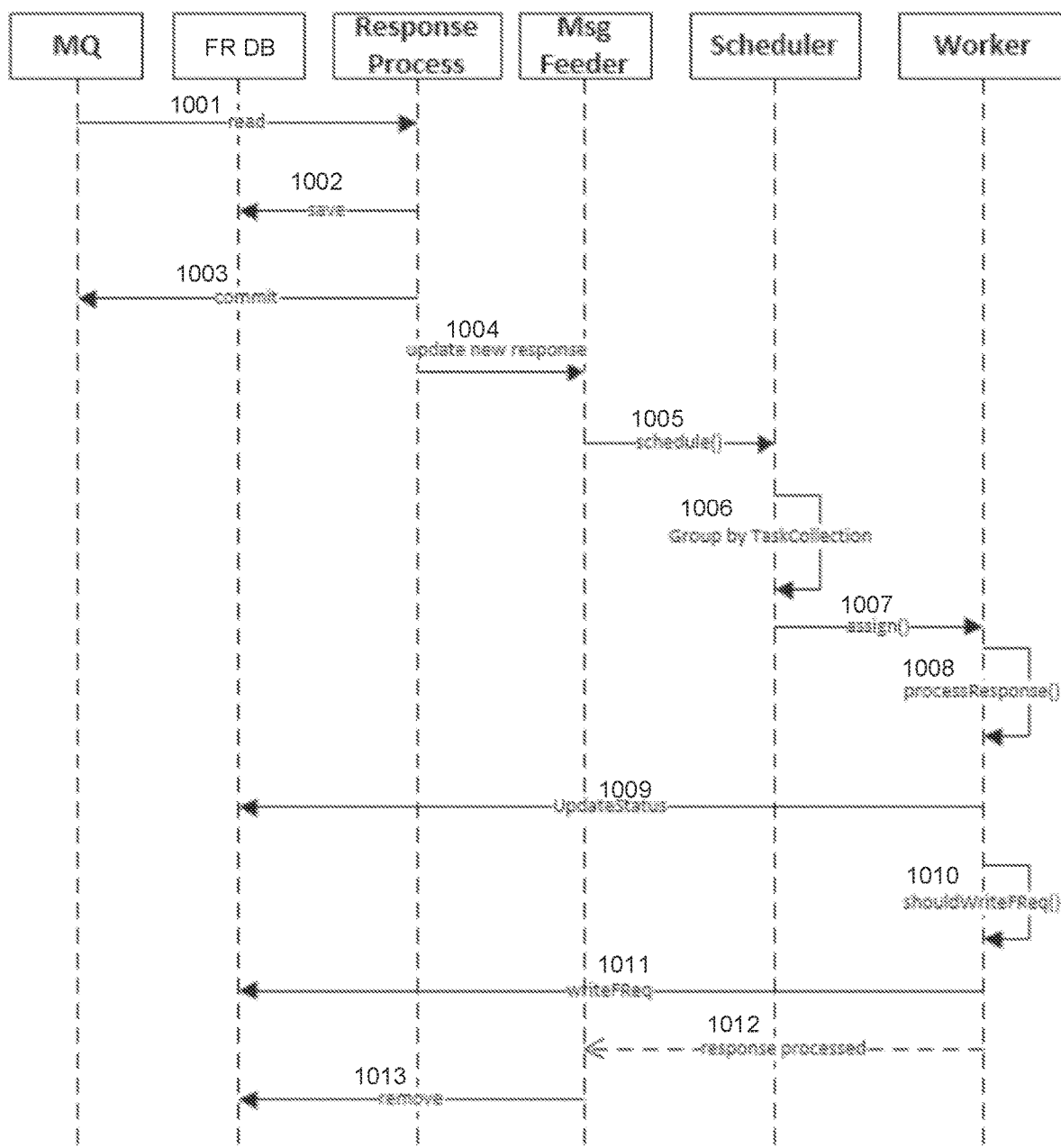
FIG. 10 is a process flow illustrating an operating system kernel persistent feed response in accordance with an exemplary embodiment.

FIG. 10 is a process flow illustrating an operating system kernel persistent feed response in accordance with an exemplary embodiment.

In operation 1001, the message queue reads a message received at the message queue and sends it to a response process for saving onto the feed request database in operation 1002. In an example, the message received at the message queue may be sent by a gateway server after processing of a feed request by a TRCDA system.

In operation 1003, the response process sends a commit signal to the message queue for clearing the respective message from its queue. In operation 1004, the response process updates a new response and sends it to the message feeder. In operation 1005, the message feeder sends the updated new response to a scheduler to schedule processing of the updated new response. In operation 1006, the scheduler groups the updated new response to a group based on commonality with other messages for more efficient processing. In operation 1007, the scheduler assigns processing of the updated new response to a worker or a computing device located locally or remotely based on at least one of resource capacity constraints (e.g., memory, CPU, capacity and etc.), priority level, locale of the computing device, and the like.

In operation 1008, the assigned worker or computing device processes the updated new response. After processing, the worker or computing device transmits the updated status to the feed request database in operation 1009. In operation 1010, the assigned worker or computing device performs shouldWriteFReq( ) function, and transmits the writeFReq to the feed request database in operation 1011. In operation 1012, the assigned worker or computing device transmits the processing of the response to the message feeder. In operation 1013, the message feeder commits to the message queue to free up memory.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for distributing data process according to technical resource capacity availability and constraints across a network, the method comprising:
   performing, using a processor and a memory:
      identifying, among a plurality of computing resources spread across a network, a computing resource for processing a feed request based on at least one attribute of the feed request and processing capacity at the plurality of computing resources;
      assigning the feed request for processing to the identified computing resource;
      processing, at the identified computing resource, the feed request;
      generating, at the identified computing resource, a downstream transaction for the processed feed request, and saving the downstream transaction at a database;
      generating, at the identified computing resource, a message indicating processing of the feed request, and saving the message at the database;
      returning, to the message feeder, the downstream transaction and the message; and
      updating the database based on the returned downstream transaction and the message.

2. The method according to claim 1, wherein the identified computing resource is located remotely.

3. The method according to claim 1, wherein the identified computing resource is located in a cloud network.

4. The method according to claim 1, wherein a data stream is informed of receiving of the feed request at the database in real time for processing of the feed request upon receipt of the feed request at the database.

5. The method according to claim 1, wherein the plurality of computing resources are spread across various geographies, countries or continents.

6. The method according to claim 1, wherein the at least one attribute includes a priority level for processing of the feed request.

7. The method according to claim 6, wherein an amount of delay before processing is determined based on the priority level.

8. The method according to claim 1, wherein the at least one attribute includes a geographic location for processing the feed request.

9. The method according to claim 1, wherein the at least one attribute includes a memory and time limit.

10. The method according to claim 1, wherein the at least one attribute includes a dedicated processing requirement.

11. The method according to claim 1, further comprising generating a report based on information updated on the database.

12. The method according to claim 11, wherein the report indicates, for a computing resource, at least one of a number of processes running per minute, a number of tasks processed per process, time percentage that each process was running, time to process a task, a number of tasks in a backlog, and a number of tasks of a same type in the backlog.

13. The method according to claim 1, wherein the feed request received by the database for processing is a feed request filtered according to an event type.

14. The method according to claim 1, wherein the at least one attribute includes a priority level for processing of the feed request, and
   the priority level for the feed request is set by a user or according to an event type of the feed request.

15. The method according to claim 1, further comprising:
   receiving, at the database, a subsequent feed request for processing;
   in response to receiving the subsequent feed request, informing, a data stream and by the database, of the receipt of the subsequent feed request at the database;
   acquiring the subsequent feed request by the data stream;
   reading and parsing the subsequent feed request for determining at least one attribute of the subsequent feed request;

checking to determine whether the feed request has been assigned for processing prior to assigning the subsequent feed request for processing; and removing the subsequent feed request from the database if the existing feed request has not yet been assigned for processing.

16. The method according to claim 1, wherein
each feed request stems from a deal, and
the method further comprises ordering of feed requests according to a deal the feed requests stem from, such that data for the deal is read only once during processing of a first feed request stemming from the deal for faster processing.

17. The method according to claim 1, wherein a lower priority level feed request is processed by a computing resource that is located further way than a higher priority level feed request.

18. The method according to claim 1, wherein the feed request is dynamically assigned for processing in real-time without a predetermined assignment to a computing resource.

19. A system for distributing data process according to technical resource capacity availability and constraints across a network, the system comprising:
- at least one processor;
- at least one memory; and
- at least one communication circuit,
- wherein the at least one processor is configured to:
- identify, among a plurality of computing resources spread across a network, a computing resource for processing a feed request based on at least one attribute of the feed request and processing capacity at the plurality of computing resources;
- assign the feed request for processing to the identified computing resource;
- process, at the identified computing resource, the feed request;
- generate, at the identified computing resource, a downstream transaction for the processed feed request, and save the downstream transaction at a database;
- generate, at the identified computing resource, a message indicating processing of the feed request, and save the message at the database;
- return, to the message feeder, the downstream transaction and the message; and
- update the database based on the returned downstream transaction and the message.

20. A non-transitory computer readable storage medium that stores a computer program for distributing data process according to technical resource capacity availability and constraints across a network, the computer program, when executed by a processor, causing a system to perform a process comprising:
- identifying, among a plurality of computing resources spread across a network, a computing resource for processing a feed request based on at least one attribute of the feed request and processing capacity at the plurality of computing resources;
- assigning the feed request for processing to the identified computing resource;
- processing, at the identified computing resource, the feed request;
- generating, at the identified computing resource, a downstream transaction for the processed feed request, and saving the downstream transaction at the database;
- generating, at the identified computing resource, a message indicating processing of the feed request, and saving the message at a database;
- returning, to the message feeder, the downstream transaction and the message; and
- updating the database based on the returned downstream transaction and the message.

\* \* \* \* \*